(12) United States Patent
O'Tuama

(10) Patent No.: US 11,889,134 B2
(45) Date of Patent: Jan. 30, 2024

(54) SYSTEM FOR QUEUING FLOWS TO CHANNELS

(71) Applicant: ARRIS Enterprises LLC, Suwanee, GA (US)

(72) Inventor: Cillian O'Tuama, Cork (IE)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 17/849,339

(22) Filed: Jun. 24, 2022

(65) Prior Publication Data

US 2022/0417569 A1 Dec. 29, 2022

Related U.S. Application Data

(60) Provisional application No. 63/215,166, filed on Jun. 25, 2021.

(51) Int. Cl.
*H04N 21/2385* (2011.01)
*H04N 21/61* (2011.01)
*H04N 21/6405* (2011.01)

(52) U.S. Cl.
CPC ..... *H04N 21/2385* (2013.01); *H04N 21/6118* (2013.01); *H04N 21/6405* (2013.01)

(58) Field of Classification Search
CPC ........... H04N 21/2385; H04N 21/6118; H04N 21/6405
See application file for complete search history.

(56) References Cited

U.S. PATENT DOCUMENTS

| | | | |
|---|---|---|---|
| 6,546,017 B1* | 4/2003 | Khaunte | H04L 47/24 370/468 |
| 2003/0065809 A1* | 4/2003 | Byron | H04L 12/2801 709/232 |
| 2008/0159140 A1* | 7/2008 | Robinson | H04L 47/36 370/232 |
| 2012/0155264 A1* | 6/2012 | Sharma | H04L 47/6215 370/232 |
| 2018/0013691 A1* | 1/2018 | Patrick | H04L 47/6215 |
| 2019/0028399 A1* | 1/2019 | Voit | H04L 47/6275 |

OTHER PUBLICATIONS

Anonymous: "Weighted round robin—Wikipedia", Apr. 17, 2021 (Apr. 17, 2021), XP055960795, Retrieved from the Internet: URL:https://en.wikipedia.org/w/index.php?title=Weighted_round_robin&oldid=1018333116 [retrieved on Sep. 14, 2022] the whole document.
International Search Report and Written Opinion RE: Application No. PCT/US2022/035008, dated Sep. 22, 2022.

* cited by examiner

*Primary Examiner* — Mulugeta Mengesha
(74) *Attorney, Agent, or Firm* — Chernoff, Vilhauer, McClung & Stenzel, LLP

(57) ABSTRACT

A system for queuing flows to channels.

9 Claims, 20 Drawing Sheets

| | INDEX | 0 | 1 | 2 | 3 | 4 | ... | 251 | 252 | 253 | 254 | 255 |
|---|---|---|---|---|---|---|---|---|---|---|---|---|
| 256 X 16 bits | FlowIdx | 7 | -1 | 14 | 341 | 73 | ... | 869 | 32 | 516 | -1 | -1 |
| 256 X 1 bit | Ch0BitsNp | 0 | 0 | 0 | 0 | 1 | ... | 1 | 0 | 0 | 0 | 0 |
| 256 X 1 bit | Ch1BitsNp | 1 | 0 | 1 | 1 | 1 | ... | 1 | 1 | 1 | 0 | 0 |
| 256 X 1 bit | Ch2BitsNp | 1 | 0 | 0 | 0 | 0 | ... | 1 | 1 | 0 | 0 | 0 |
| 256 X 1 bit | Ch3BitsNp | 0 | 0 | 1 | 1 | 1 | ... | 0 | 1 | 0 | 0 | 0 |
| 256 X 1 bit | Ch4BitsNp | 0 | 0 | 1 | 0 | 1 | ... | 0 | 1 | 0 | 0 | 0 |
| ... | ... | ... | ... | ... | ... | ... | ... | ... | ... | ... | ... | ... |
| 256 X 1 bit | Ch62BitsNp | 0 | 0 | 0 | 1 | 1 | ... | 0 | 1 | 0 | 0 | 0 |
| 256 X 1 bit | Ch63BitsNp | 0 | 0 | 0 | 0 | 1 | ... | 0 | 0 | 0 | 0 | 0 |
| 256 X 1 bit | Ch0BitsP | 0 | 0 | 0 | 1 | 1 | ... | 0 | 1 | 1 | 0 | 0 |
| 256 X 1 bit | Ch1BitsP | 1 | 0 | 1 | 0 | 1 | ... | 0 | 0 | 0 | 0 | 0 |
| 256 X 1 bit | Ch2BitsP | 0 | 0 | 0 | 1 | 0 | ... | 0 | 1 | 1 | 0 | 0 |
| 256 X 1 bit | Ch3BitsP | 0 | 0 | 1 | 1 | 1 | ... | 0 | 0 | 1 | 0 | 0 |
| 256 X 1 bit | Ch4BitsP | 0 | 0 | 1 | 0 | 1 | ... | 0 | 1 | 0 | 0 | 0 |
| ... | ... | ... | ... | ... | ... | ... | ... | ... | ... | ... | ... | ... |
| 256 X 1 bit | Ch62BitsP | 0 | 0 | 0 | 1 | 1 | ... | 0 | 0 | 1 | 0 | 0 |
| 256 X 1 bit | Ch63BitsP | 0 | 0 | 0 | 0 | 1 | ... | 0 | 0 | 0 | 0 | 0 |

CHANNEL 4

TAIL 254

FIG. 9

| INDEX | Bitmaps (256 X 128bit) | |
|---|---|---|
| 0 | bitmaps_flow7 | |
| 1 | zero_bitmap | |
| 2 | bitmaps_flow14 | |
| 3 | bitmaps_flow341 | |
| 4 | bitmaps_flow73 | |
| ⋮ | ⋮ | |
| 251 | bitmaps_flow869 | |
| 252 | bitmaps_flow32 | |
| 253 | zero_bitmap | Tail |
| 254 | zero_bitmap | |
| 255 | zero_bitmap | |

| INDEX | Flowidx | (256 X 16bit) |
|---|---|---|
| 0 | 32 | |
| 1 | -1 | Tail |
| 2 | -1 | |
| 3 | -1 | |
| 4 | 7 | Head |
| 5 | -1 | |
| 6 | 14 | |
| 7 | 341 | |
| 8 | 73 | |
| ⋮ | ⋮ | |
| 255 | 869 | |

FIG. 16

| INDEX | Bitmaps (256 X 128bit) | |
|---|---|---|
| 0 | bitmaps_flow7 | |
| 1 | zero_bitmap | |
| 2 | bitmaps_flow14 | |
| 3 | bitmaps_flow341 | |
| 4 | bitmaps_flow73 | |
| ... | ⋮ | |
| 251 | bitmaps_flow869 | |
| 252 | bitmaps_flow32 | |
| 253 | bitmaps_flow516 | |
| 254 | zero_bitmap | Tail |
| 255 | zero_bitmap | |

| INDEX | Flowidx | (256 X 16bit) |
|---|---|---|
| 0 | 32 | |
| 1 | 516 | |
| 2 | -1 | Tail |
| 3 | -1 | |
| 4 | 7 | Head |
| 5 | -1 | |
| 6 | 14 | |
| 7 | 341 | |
| 8 | 73 | |
| ... | ⋮ | |
| 255 | 869 | |

FIG. 17

| INDEX | Bitmaps (256 X 128bit) | |
|---|---|---|
| 0 | bitmaps_flow7 | |
| 1 | zero_bitmap | |
| 2 | zero_bitmap | |
| 3 | bitmaps_flow341 | |
| 4 | bitmaps_flow73 | |
| ... | ... | |
| 251 | bitmaps_flow869 | |
| 252 | bitmaps_flow32 | |
| 253 | bitmaps_flow516 | |
| 254 | zero_bitmap | Tail |
| 255 | zero_bitmap | |

| INDEX | Flowidx | (256 X 16bit) |
|---|---|---|
| 0 | 32 | |
| 1 | 516 | |
| 2 | -1 | Tail |
| 3 | -1 | |
| 4 | 7 | Head |
| 5 | -1 | |
| 6 | -1 | |
| 7 | 341 | |
| 8 | 73 | |
| ... | ... | |
| 255 | 869 | |

FIG. 18

| Index | Bitmaps (256 X 128bit) | |
|---|---|---|
| 0 | bitmaps_flow341 | |
| 1 | bitmaps_flow73 | |
| 2 | bitmaps_flow562 | |
| 3 | bitmaps_flow29 | |
| 4 | bitmaps_flow778 | |
| ... | ⋮ | |
| 251 | zero_bitmap | Tail |
| 252 | zero_bitmap | |
| 253 | zero_bitmap | |
| 254 | zero_bitmap | |
| 255 | zero_bitmap | |

| Index | Flowidx | (256 X 16bit) |
|---|---|---|
| 0 | 32 | |
| 1 | 516 | |
| 2 | -1 | Tail |
| 3 | -1 | |
| 4 | -1 | |
| 5 | -1 | |
| 6 | -1 | |
| 7 | 341 | Head |
| 8 | 73 | |
| ... | ⋮ | |
| 255 | 869 | |

FIG. 19

SYSTEM FOR QUEUING FLOWS TO CHANNELS

CROSS REFERENCE TO RELATED APPLICATIONS

The present application claims the benefit of U.S. Provisional Patent Application Ser. No. 63/215,166 filed Jun. 25, 2021.

BACKGROUND

The subject matter of this application relates to a system for queuing flows to channels.

Cable Television (CATV) services provide content to large groups of customers (e.g., subscribers) from a central delivery unit, generally referred to as a "head end," which distributes channels of content to its customers from this central delivery unit through an access network comprising a hybrid fiber coax (HFC) cable plant, including associated components (nodes, amplifiers and taps). Modern Cable Television (CATV) service networks, however, not only provide media content such as television channels and music channels to a customer, but also provide a host of digital communication services such as Internet Service, Video-on-Demand, telephone service such as VoIP, home automation/security, and so forth. These digital communication services, in turn, require not only communication in a downstream direction from the head end, through the HFC, typically forming a branch network and to a customer, but also require communication in an upstream direction from a customer to the head end typically through the HFC network.

To this end, CATV head ends have historically included a separate Cable Modem Termination System (CMTS), used to provide high speed data services, such as cable Internet, Voice over Internet Protocol, etc. to cable customers and a video headend system, used to provide video services, such as broadcast video and video on demand (VOD). Typically, a CMTS will include both Ethernet interfaces (or other more traditional high-speed data interfaces) as well as radio frequency (RF) interfaces so that traffic coming from the Internet can be routed (or bridged) through the Ethernet interface, through the CMTS, and then onto the RF interfaces that are connected to the cable company's hybrid fiber coax (HFC) system. Downstream traffic is delivered from the CMTS to a cable modem and/or set top box in a customer's home, while upstream traffic is delivered from a cable modem and/or set top box in a customer's home to the CMTS. The Video Headend System similarly provides video to either a set-top, TV with a video decryption card, or other device capable of demodulating and decrypting the incoming encrypted video services. Many modern CATV systems have combined the functionality of the CMTS with the video delivery system (e.g., EdgeQAM—quadrature amplitude modulation) in a single platform generally referred to an Integrated CMTS (e.g., Integrated Converged Cable Access Platform (CCAP))—video services are prepared and provided to the I-CCAP which then QAM modulates the video onto the appropriate frequencies. Still other modern CATV systems generally referred to as distributed CMTS (e.g., distributed Converged Cable Access Platform) may include a Remote PHY (or R-PHY) which relocates the physical layer (PHY) of a traditional Integrated CCAP by pushing it to the network's fiber nodes (R-MAC PHY relocates both the MAC and the PHY to the network's nodes). Thus, while the core in the CCAP performs the higher layer processing, the R-PHY device in the remote node converts the downstream data sent from the core from digital-to-analog to be transmitted on radio frequency to the cable modems and/or set top boxes, and converts the upstream radio frequency data sent from the cable modems and/or set top boxes from analog-to-digital format to be transmitted optically to the core.

BRIEF DESCRIPTION OF THE DRAWINGS

For a better understanding of the invention, and to show how the same may be carried into effect, reference will now be made, by way of example, to the accompanying drawings, in which:

FIG. 9 illustrates bitmaps representing flows enqueued to a particular channel.

FIG. 16 illustrates queue structure for case where the list of flow numbers is managed separately from queue of channel bitmaps for each flow, with correspondence shown between the bitmap queue, where the head is based on position 0, and the circular list of flow numbers, where both head and tail traverse the list as flows are added and removed.

FIG. 17 illustrates enqueuing a flow as in FIG. 7 and FIG. 8, in situation where there are separate queues for bitmaps and flow numbers.

FIG. 18 illustrates dequeuing a flow that is not at the head of the queue, as in FIG. 10 and FIG. 11.

FIG. 19 illustrates dequeuing a flow from the head, similar to FIG. 13.

DETAILED DESCRIPTION

Figure 1:
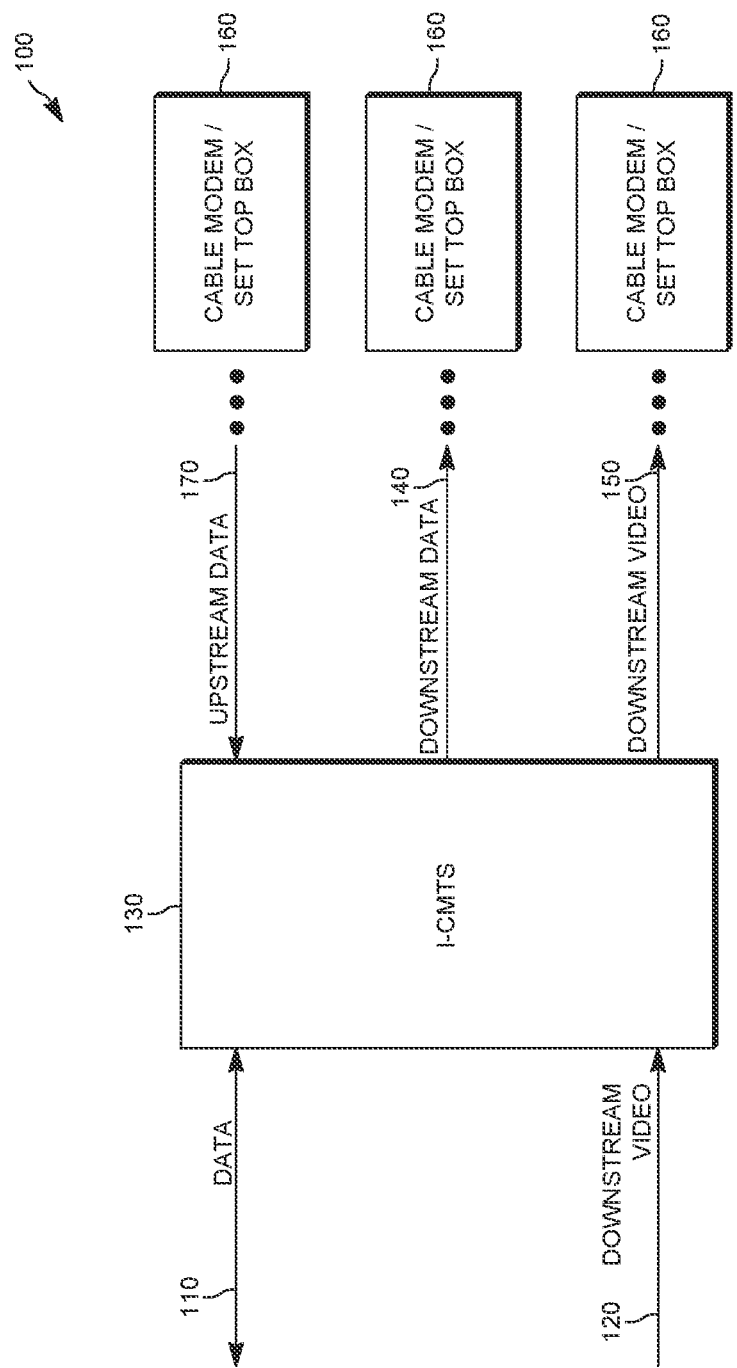
FIG. 1 illustrates an integrated Cable Modem Termination System.

Referring to FIG. 1, an integrated CMTS (e.g., Integrated Converged Cable Access Platform (CCAP)) 100 may include data 110 that is sent and received over the Internet (or other network) typically in the form of packetized data. The integrated CMTS 100 may also receive downstream video 120, typically in the form of packetized data from an operator video aggregation system. By way of example, broadcast video is typically obtained from a satellite delivery system and pre-processed for delivery to the subscriber though the CCAP or video headend system. The integrated CMTS 100 receives and processes the received data 110 and downstream video 120. The CMTS 130 may transmit downstream data 140 and downstream video 150 to a customer's cable modem and/or set top box 160 through a RF distribution network, which may include other devices, such as amplifiers and splitters. The CMTS 130 may receive upstream data 170 from a customer's cable modem and/or set top box 160 through a network, which may include other devices, such as amplifiers and splitters. The CMTS 130 may include multiple devices to achieve its desired capabilities.

Figure 2:
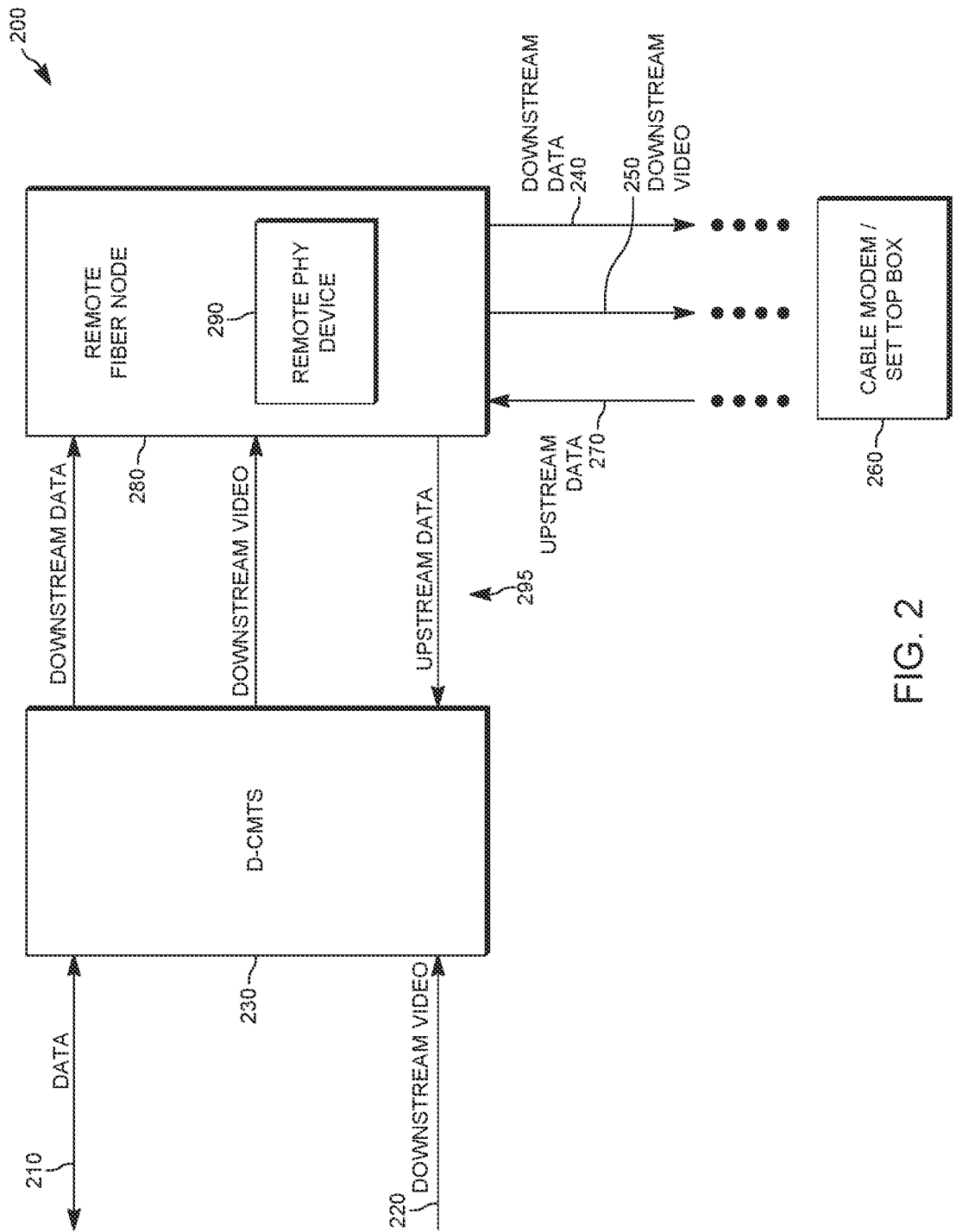
FIG. 2 illustrates a distributed Cable Modem Termination System.

Referring to FIG. 2, as a result of increasing bandwidth demands, limited facility space for integrated CMTSs, and power consumption considerations, it is desirable to include a Distributed Cable Modem Termination System (D-CMTS) 200 (e.g., Distributed Converged Cable Access Platform (CCAP)). In general, the CMTS is focused on data services while the CCAP further includes broadcast video services. The D-CMTS 200 distributes a portion of the functionality of the I-CMTS 100 downstream to a remote location, such as a fiber node, using network packetized data. An exemplary D-CMTS 200 may include a remote PHY architecture, where a remote PHY (R-PHY) is preferably an optical node device that is located at the junction of the fiber and the coaxial. In general, the R-PHY often includes the PHY layers of a portion of the system. The D-CMTS 200 may include a D-CMTS 230 (e.g., core) that includes data 210 that is sent and received over the Internet (or other network) typically in the form of packetized data. The D-CMTS 200 may also receive downstream video 220, typically in the form of packetized data from an operator video aggregation system. The D-CMTS 230 receives and processes the received data 210 and downstream video 220. A remote Fiber node 280 preferably include a remote PHY device 290. The remote PHY device 290 may transmit downstream data 240 and downstream video 250 to a customer's cable modem and/or set top box 260 through a network, which may include other devices, such as amplifier and splitters. The remote PHY device 290 may receive upstream data 270 from a customer's cable modem and/or set top box 260 through a network, which may include other devices, such as amplifiers and splitters. The remote PHY device 290 may include multiple devices to achieve its desired capabilities. The remote PHY device 290 primarily includes PHY related circuitry, such as downstream QAM modulators, upstream QAM demodulators, together with psuedowire logic to connect to the D-CMTS 230 using network packetized data. The remote PHY device 290 and the D-CMTS 230 may include data and/or video interconnections, such as downstream data, downstream video, and upstream data 295. It is noted that, in some embodiments, video traffic may go directly to the remote physical device thereby bypassing the D-CMTS 230. In some cases, the remote PHY and/or remote MAC PHY functionality may be provided at the head end. As used herein, the "head end" may include the cable system upstream of the customer premise device(s).

By way of example, the remote PHY device 290 may covert downstream DOCSIS (i.e., Data Over Cable Service Interface Specification) data (e.g., DOCSIS 1.0; 1.1; 2.0; 3.0; 3.1; and 4.0 each of which are incorporated herein by reference in their entirety), video data, out-of-band signals received from the D-CMTS 230 to analog for transmission over RF or analog optics. By way of example, the remote PHY device 290 may convert upstream DOCSIS, and out-of-band signals received from an analog medium, such as RF or linear optics, to digital for transmission to the D-CMTS 230. As it may be observed, depending on the particular configuration, the R-PHY may move all or a portion of the DOCSIS MAC and/or PHY layers down to the fiber node.

By way of example, the I-CMTS devices are typically custom-built hardware devices that consist of a single chassis that include a series of slots, each of which receives a respective line card with a processor, memory, and other computing and networking functions supported thereon. By way of example, the CMTS may be instantiated on a "bare metal" server and/or virtual machine. The functionality provided by such a dedicated hardware device and/or "bare metal" server and/or virtual machine may include DOCSIS functions such as for example, DOCSIS MAC and encapsulation, channel provisioning, service flow management, quality of service and rate limiting, scheduling, and encryption. The functionality provided by such a dedicated hardware and/or "bare metal" server and/or virtual machine may include video processing such as for example, EQAM and MPEG processing.

In native MPEG deployments, many solutions are broadcast type architectures. All of the television video streams would normally be carried all the time on a set of RF channels. A single RF channel may carry several television video streams. In the case that the viewer has a set-top-box, the set-top-box would tune to the RF channel where a desired television steam could be found.

Figure 3:
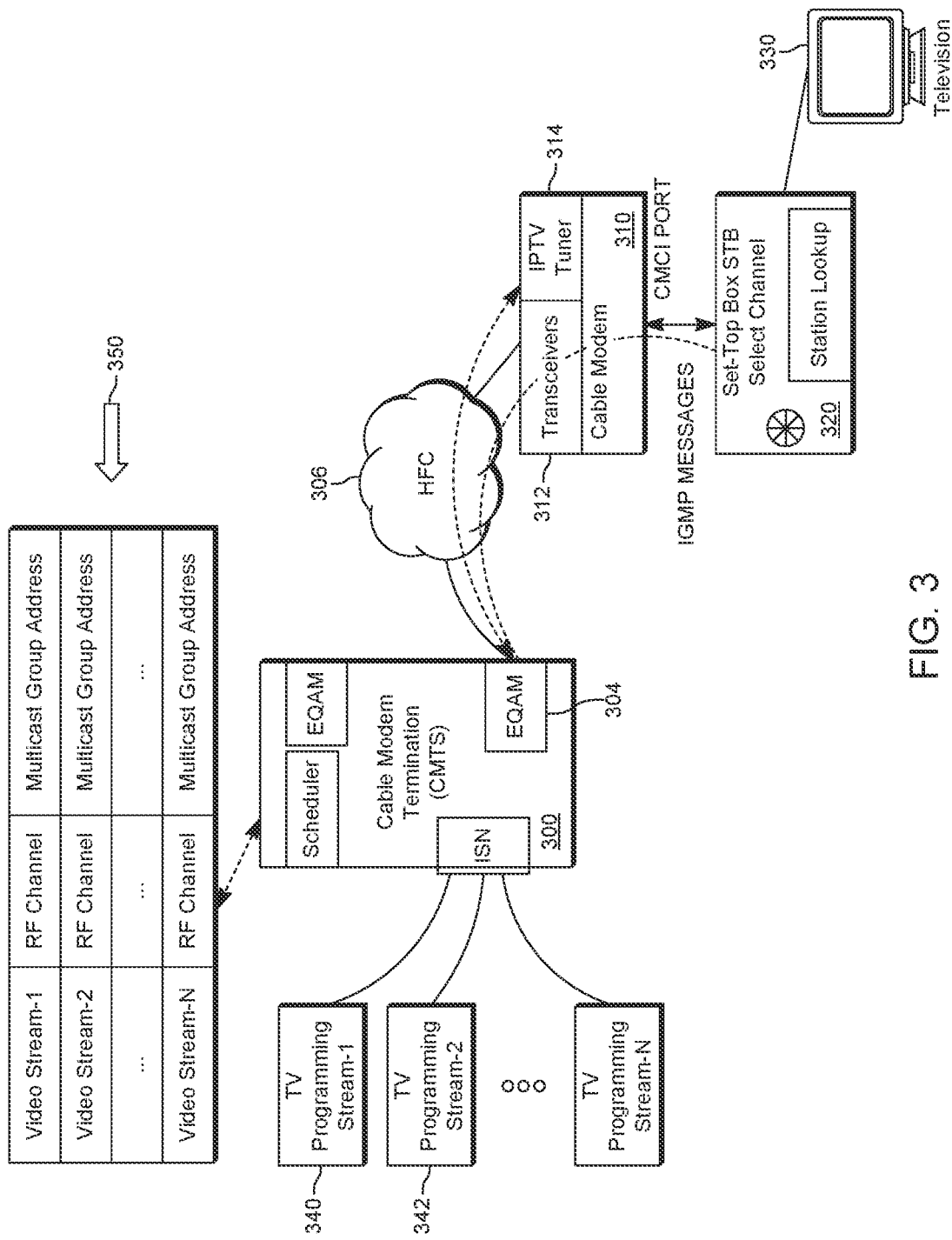
FIG. 3 illustrates a layered network processing stack.

FIG. 3 is a simplified overview of a cable network, with a CMTS 300, as discussed earlier, that preferably includes at least one EQAM 304, for transmission over the HFC network 306 to subscribers. A cable modem 310 may include multiple transceivers 312, 314. A set-top box (STB) 320 is coupled to, or includes, the cable modem 310. A display/television 330 is connected to the set-top-box. The set-top-box 320 enables a user, via front panel or remote control or otherwise, to select desired video programming for display on the display/television.

The set-top-box enables "station" selection, for example by cable service "channel number" (typically a two or three digit integer), or call letters ("KTRB" "KGRB") or other well-known video broadcast source identifiers ("ESPN" "CNN" "OPB" etc.) or some combination of these identifiers. Content from each of these sources is delivered to the cable network. These input streams 340, 342 for example, may be provided to the CMTS 300 via an IP network, or any other suitable manner. The CMTS typically maintains a database, lookup table, or the like, illustrated at 350, which stores the corresponding multicast group address for each input stream. In addition, the CMTS assigns an RF channel to each stream.

In one embodiment, the set-top-box 320 maintains a database, lookup table, or the like (not shown), that stores the correspondence between the popular station identifiers ("ESPN" etc.) and the corresponding video stream multicast group address. This information is used for the STB to request the programming selected by a user for recording or display. In some embodiments, the set-top-box may acquire or update the programming-to-multicast address mapping via a middleware application. By way of example, the set-top-box or other subscriber equipment may request an entire mapping of available streams, or an update of the mapping, or just the mapping for one or more specific streams. By way of example, these mappings may be predetermined, and stored in memory, or downloaded from a third party resource such as a website in advance or in real time. Moreover, the CMTS or other system remote from the set-top-box creates, updates, and maintains the channel mapping.

The DOCSIS protocol is used to support quality of service (QoS) for traffic between the cable modem and the CMTS device. To support QoS, the DOCSIS protocol uses the concept of service flows for traffic that is transmitted between cable modems and CMTS devices. A service flow is a unidirectional flow of packets that provides a particular quality of service. Traffic is classified into a service flow, and each service flow has its own set of QoS parameters, such as maximum bit rate, minimum bitrate, priority, encryption, etc. Also configured for each service flow is a set of channels on which packets for that flow may be transmitted. By way of example, the services may be for voice call, generalized Internet traffic, etc.

Figure 4:
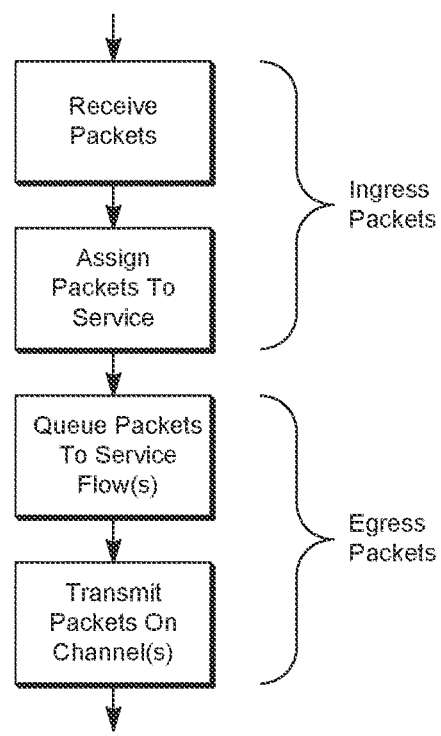
FIG. 4 illustrates ingress and egress of packets.

Referring to FIG. 4, within dataplane processing of the CMTS, there are what are generally referred to as ingress packets which are received and then assigned to a service flow, the assigned packets to a service flow are queued, and what are generally referred to as egress packets which are already assigned to a service flow and then transmitted toward their destination. Each of the service flows may use one, a plurality of, or all of their configured downstream channels to provide the packets to their destination(s). Also, each of the service flows may use the same set of one or more channels as one or more of the other service flows, or a different set of one or more channels than the other service flows.

One technique to perform such service flow assignment is to enqueue each service flow to each of its channels individually (e.g., as packets arrive they are queued to a service flow where the service flow is queued to one or more channels), and then dequeuing is performed on a per-channel basis by taking the first available service flow that was queued to it. This results in a service flow that may be dequeued from multiple channels at the same time. As a result, multi-core (concurrency) issues arise when multiple cores (or tasks) are used for different channels. Also, enqueuing a service flow to many (e.g., 32) channels for each packet is computationally burdensome. In addition, DOCSIS QoS requires the prioritization of traffic, using up to 16 levels, which necessitates 16 queues for each downstream channel, with up to 64 downstream channels per servicing group, which results in up to 1024 queues per service group. This requires a lot of memory and memory bandwidth for queuing operations. Also, because flows are dequeued independently on each of the channels, many aspects of downstream QoS, e.g., DOCSIS token bucket, congestion-control, load-balancing, need to be run separately per-channel for each service flow. This leads to an overall QoS mechanism being complicated and difficult to ensure compliant operations.

In general, at the dequeuing side, the system is attempting to locate packets to send for a particular channel. This process of attempting to locate packets to send may require searching through all of the queued service flows to find the first one that is eligible to send on the channel that the system is interested in sending packets on. It is noted that the channel may be a physical channel (e.g., ODFM, SC-QAM), or a virtual channel.

Figure 5:
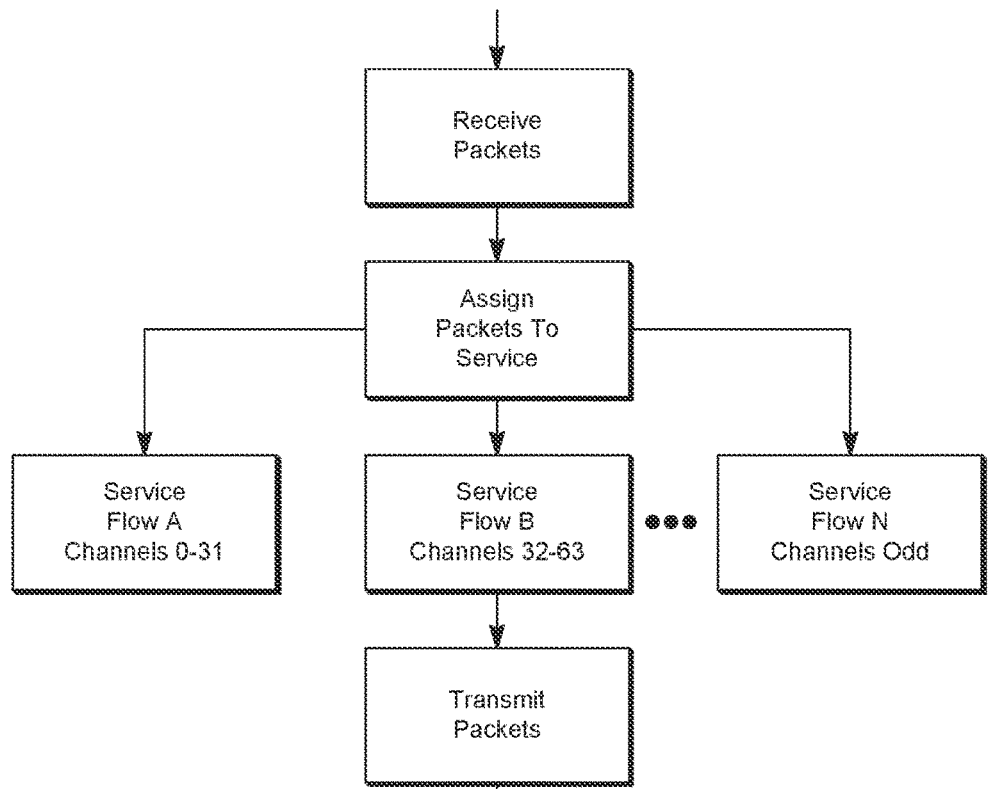
FIG. 5 illustrates packet assignment to service flows.

Referring to FIG. 5, within dataplane processing of the CMTS as the packets are received they are assigned to a service flow. Each service flow may be assigned to a selected set of one or more channels. Accordingly, on the ingress side the packets are queued to the service flow and the service flow is queued to the channels). For example, service flow A may be assigned to channels 0-31 of a system with 64 channels. For example, service flow B may be assigned to channels 32-63 of a system with 64 channels. For example, service flow C may be assigned to odd channels 1, 3, . . . 63 of a system with 64 channels. By way of further example, for pre-DOCSIS 3.0 compatible modems a service flow only has access to a single channel. By way of further example, for DOCSIS 3.1 compatible modems a service flow can be configured to only be on a single OFDM channel. By way of further example, situations exist where it is desirable to avoid the overhead of channel bonding and maintain a service flow on a single channel, such as for voice flows or signalling flows. Efficient service flow processing for such examples is desirable. In this manner, each service flow may have a different allocation of channels which it may use. The packets are queued and then dequeuing is performed on a per-channel basis by taking the first available service flow that was queued to it. Accordingly, at the egress side when it is desirable to transmit a packet for a particular channel, it is desirable to find the first eligible service flow.

It may occur that a substantial number of flows may need to be examined to find a first eligible flow. The search for the first eligible flow is further complicated because not all service flows are typically configured to send on all channels. This process may be problematic in some situations. For example, if 200 service flows are queued and the last service flow is the only one permitted to transmit on channel 0. In this case, it may require searching through 200 service flows to determine that the last one is allowed to be sent on channel 0, which is computationally burdensome.

A modified technique to reduce the processor utilization may include the service flows being queued to additional channels, one at a time, as a packet backlog is built up for the service flow. The addition of channels may be done for 1 in N packets, where N is increased as more channels are added. The result of this is a slow ramp up time for high bit rate flows. Thus, the addition of channels for a service flow is based upon the build-up of packet queues. In this manner, the modified technique adds and removes channels based on if the service flow appears to need them or not. Also, multiple service flows may use the same channel. This technique is based upon an assumption that the packet queue is only the result of channel congestion. However, a packet queue can also build up if a flow is exceeding its configured max-rate, which needs to be differentiated from the case of channel congestion. This differentiation is not always apparent, since both may occur simultaneously, and channel congestion may result in max-rate limiting due to burstiness. Once a service flow has been queued to a channel, there is no straightforward manner to remove it to handle situations where the packet queue has been emptied onto other channels, the flow had been deactivated, or a partial service event (e.g., partial service is a flow-reconfiguration event where the configured channel set is modified, typically to remove a channel that has been detected as having poor signal quality) had occurred. Accordingly, a substantial amount of computational processing is needed when dequeuing a service flow.

A simplified manner of queuing is desirable, where a single queue for a service group (e.g., service group, connector, mac-domain) may replace all the individual channel queues. One challenge is that when dequeuing for a channel with the service group, it may be necessary to skip the service flow at the head of the queue, and on occasion many other service flows, since the service flows generally won't be eligible to send traffic on all channels. When a suitable flow is determined, it is removed from the queue. By way of example, voice-based service flows often use 1 channel per voice, which may require substantial searching to dequeue.

The queuing of service flows to a substantial number of channels may be represented as a bitmap of 64 bits (or other number of bits), with a 1 indicating that a flow can transmit on a particular channel within the service group. A technique is desired to queue multiple service flows with their configured bitmaps at ingress, and to efficiently find the first flow eligible to transmit on a particular channel at egress. In general, searching through a list of bitmaps for the first one with a particular bit set will be inefficient, as it may be necessary to search through hundreds of bitmaps before finding a suitable one, or determining that no flow can transmit on that channel. An example of this is a case where there are lots of flows transmitting such that their total bitrate will fit on the OFDM channel(s). Such flows are typically configured to use both OFDM and SC-QAM channels. This reduces the impact on older cable modems that can only use SC-QAM channels while newer cable modems can also use OFDM channels. This may be done by clearing the SC-QAM bits from the bitmaps. When dequeuing for an SC-QAM channel, all flow bitmaps may need to be examined before finally determining that no flow should transmit.

Figure 6:
FIG. 6 illustrates a queuing structure.

Referring to FIG. 6, a modified queuing mechanism involves the use of a 'transpose' operation to swap rows and columns of a matrix, or otherwise use a matrix having a different configuration. The queue is ordered in columns, from left to right, with service flows being queued at positions with indexes in the range 0 to 255. The rows correspond to individual downstream channels in the service group and are referred to herein for purpose of identification as 'channel bitmaps'. For example, the channel bitmaps may each have a size of 256 bits for the queue. In some implementations, the bits of a respective channel bitmap may be written to and read from block RAM in 32 or 64 or 128-bit chunks (or otherwise). Accordingly, the channel bitmaps are preferably organised as 8×32-bits or 4×64-bits or 2×128-bits. In general, a block RAM is a block of random-access memory, commonly included within a field programmable gate array. Also, the data is written as a series of bits forming a word suitable to be written to memory as a series of consecutive bits.

In one embodiment, a FPGA may include 32 BRAM structures that together with crossed address lines may be used to read selected bits from each of the 32 BRAM structures, such as the same bit for each of the service groups and/or channels. Also, with a BRAM having 2 ports, the system may read and write to each port separately. For example, 1 port may be used in a standard way to write the 64-bit words for each service flow as they are queued. For example, the other port with crossed address lines may be configured to read a bit from each BRAM. Therefore, the FPGA may write 64 bits for a first service flow into a first BRAM and write 64 bits for a second service flow into a second BRAM, and so on. Then when reading the written data, the bits are read out in a different arrangement, which is akin to transposing the rows and columns. While feasible, this approach can be wasteful of BRAM as it consumes 32 devices, and this may correspond to a lot more BRAM space than is needed for the queuing. Therefore, it is desirable to emulate this transposing functionality using a different method.

As shown in FIG. 6, the head of the queue may be at index 0 and service flow number 7 is at the head. Following service flow 7, service flows 14, 341, 73, . . . , 869, 32 (most omitted for brevity) are queued to the service group. Unused locations are flagged with FlowIdx=−1 (or other unique identifier) and bitmaps of all zeros. Setting unused bitmaps to zero (or other known number) ensure that, when searching for a flow to send traffic on a particular channel, any unused flow locations are not returned. Note that there is a gap after the service flow at the head of the queue, corresponding to a service flow that was previously removed. Any gaps are then skipped for queuing purposes. The tail of the queue is at location 253. The maximum queue size is 256 in this example, so the queue in FIG. 6 is almost full.

It is noted that each service flow may have two 64-bit bitmaps, a 'preferred' and a 'non-preferred'. These two bitmaps correspond to dequeuing priority, i.e., preferred bitmaps are examined first (to find a service flow), and if no service flow is found, the non-preferred bitmaps are looked at. Therefore, there are 128 rows in FIG. 6 in total, corresponding to priority channels. These can be thought of as 'virtual channels', decoupled from the original physical channels.

The following description references the service group queue that includes 256 elements for purposes of discussion. In many cases, such as for a remote MAC PHY device, downstream QoS service flows, another, high-priority queue may be used. This similarly may have preferred and non-preferred bitmaps, and preferably has size 64 rather than 256 (i.e., a smaller queue), but apart from this, may be identical to the 256-element queue.

The preferred and non-preferred bitmaps for the service flows queued in FIG. 6 include:

Flow 7: preferred 01000 . . . 00b, non-preferred 01110 . . . 00b (64 bits, middle bits omitted for brevity);

Flow 14: preferred 00101 . . . 00b, non-preferred 00101 . . . 00b;

Flow 341: preferred 01010 . . . 10b, non-preferred 01010 . . . 10b;

Flow 73: preferred 11101 . . . 11b, non-preferred 11101 . . . 11b;

Flow 869: preferred 00000 . . . 00b, non-preferred 11100 . . . 00b; and

Flow 32: preferred 00101 . . . 00b, non-preferred 00111 . . . 10b.

It is noted that the non-preferred bitmaps should be a subset of the preferred bitmaps. In the example shown in FIG. 6, flow 7 is configured to use downstream channel indexes 1, 2, 3 and has preferential access to channel 1.

It is noted that, as a result, the system may use a series of exemplary 64 bits, which represent the exemplary 64 channels that may be used for a series of respective service flows. In this manner, the 2×64 bits for a single service flow may be written to a memory location in an efficient manner as a series of bits. Therefore, as additional service flows are queued, two additional 64-bit words are used to represent the channels permitted for the additional service flow.

Figure 7:
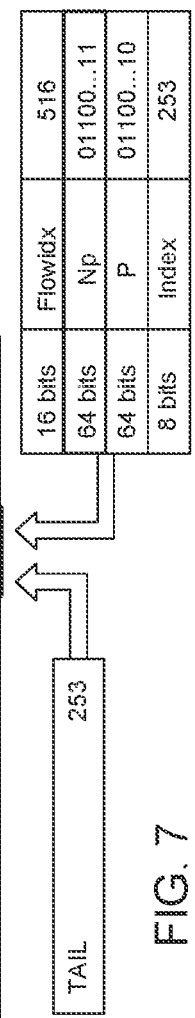
FIG. 7 illustrates enqueuing a service flow.

When enqueuing a service flow it is added to the tail of the existing queue. Referring to FIG. 7, service flow 516 is being added to the queue where the tail pointer is set to 253. Flow 516 has a preferred bitmap 01100 . . . 10b and non-preferred bitmap 01100 . . . 11b. Entry 253 in the queue is marked with an invalid FlowIdx −1 and the bitmaps are zero.

Figure 8:
FIG. 8 illustrates an enqueued service flow.

Referring to FIG. 8, the queue contents are illustrated after the new service flow 516 has been added. From a channel perspective, enqueuing the service flow 516 has set bit 253 in the following bitmaps: channel 1 non-pref, channel 2 non-pref, channel 62 non-pref, channel 63 non-pref, channel 1 pref, channel 2 pref, channel 62 pref. The tail pointer is moved to 254, which is where the next service flow to be enqueued is preferably added.

The service flows are enqueued to the tail of the queue, even if there are gaps in the queue where the service flow could be inserted. Inserting service flows arbitrarily into the middle of the queue may result in providing preferential treatment to such service flows, which can lead to undesirable QoS behaviour.

When dequeuing a service flow for egress processing, QoS operates in the context of a single downstream channel. That is, what the system wants is to locate a flow that can transmit on a particular channel. This involves an examination of, first the 256-bit preferred bitmap, and if no flow is found, the non-preferred bitmap. To maintain queue order, the bits are searched from left to right for the first bit set. Any gaps in the queue have their bitmaps set to all zeros so they will not be returned by any such search.

Referring to FIG. 9, an illustration of 256-bit vectors that are examined to dequeue a service flow from downstream channel index 4 is illustrated. The first service flow with a bit set in the preferred bitmap for downstream channel 4 is at position 2 in the queue, which is flow number 14. When dequeuing, the system often won't be able to take the flow at the head of the queue, i.e., in the case where this service flow doesn't have any bits set for the current channel. Therefore, the system should support dequeuing a flow from locations other than the head, as illustrated in FIG. 10 and FIG. 11.

Figure 10:
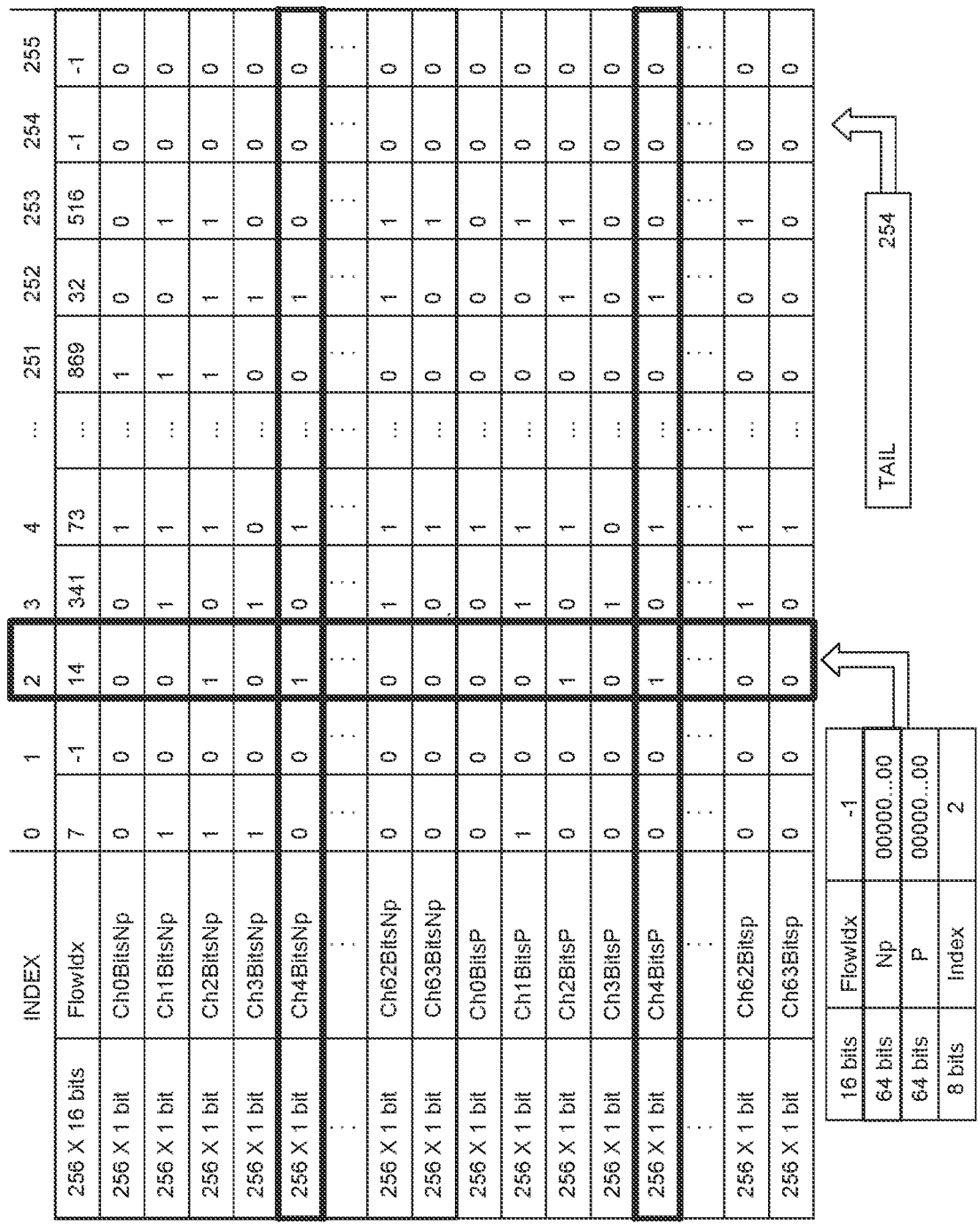
FIG. 10 illustrates operation for removing a service flow from the queue.
Figure 11:
FIG. 11 illustrates queue contents after removal of a single flow.

Referring to FIG. 10 and FIG. 11, an entry with FlowIdx=−1 and bitmaps of all zeros is written to the location where the dequeued flow was found. This location may then be skipped in future searches. If it is found to be beneficial for performance, the zeroing of the location may be skipped, and instead a separate single 256-bit vector maintained, where a bit is set if there is a valid flow enqueued to that location. In this case, when dequeuing, the 256-bit vector for the channel must be ANDed with the valid-flow bitmap. It is noted that service flows that are newly enqueued preferably go to the tail, even if there are gaps within the queue. This is to avoid giving service flows that 'skip the queue' preferential treatment in DS QoS. The dequeuing took a flow from within the queue. It is possible that the head of the queue will be taken, if it has a bit set for the current channel.

Figure 12:
FIG. 12 illustrates dequeuing for a channel where the flow at the head will be dequeued.
Figure 13:
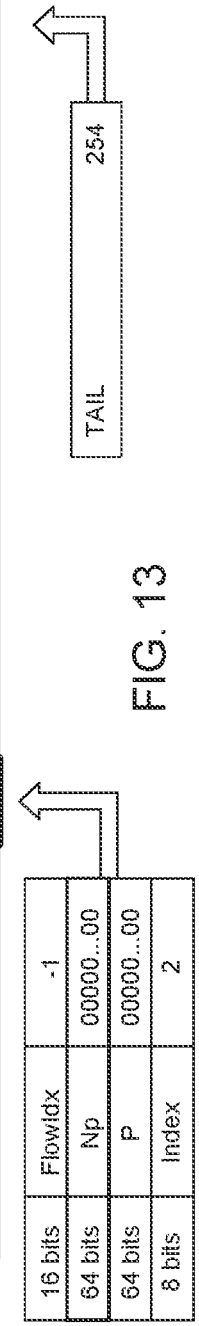
FIG. 13 illustrates removal of the service flow at the head of the queue.

Referring to FIG. 12 and FIG. 13, dequeuing for downstream channel 1, where service flow 7 at the head of the queue has bit 1 set in its preferred bitmap. Using the same process as previously described, flow 7 may be removed from the queue by clearing the entry.

Figure 14:
FIG. 14 illustrates empty queue positions at the head of the queue.
Figure 15:
FIG. 15 illustrates queue contents after shifting queue to the left to remove empty positions at the head.

The removal of the head element from the list results in a gap at the head, so the list can be shifted to move a new element to the head, as desired. Referring to FIG. 14, there are now 3 consecutive gaps starting at the head of the queue, so the queue can be left-shifted by 3 to remove these. The resulting queue is shown in FIG. 15, where the tail has also been moved back by 3 to account for the left-shifting. The next flow to be enqueued may be written to location 251. Preferably, the 3 columns on the right are filled with zero-bits and FlowIdx=−1. In practice, the step of clearing the entry at the head of the queue may be achieved by a left-shift of the queue by 3 to remove the first 3 queue elements.

By way of example, in a field programmable gate array, the implementation may be split between the programmable logic and associated software.

For example, 128 vectors of 256 bits in BRAM managed by programmable logic on instruction from software:

```
sgnprefchbits<1:0><63:0><255:0>;
sgprefchbits<1:0><63:0><255:0>;
```

These are 64 bitmaps of 256 bits for each downstream channel (non-preferred), and another set of 64 for preferred bitmaps for each channel;

The storage may be 32 Kbits, or 4 KB total;

There may be one of these queues per service group, so two in total. High-priority queues per service group may be included, with 64 elements rather than 256. Total storage may be 2×(4 KB+1 KB)=10 KB;

The bitmaps may be read and written to by programmable logic on instruction from the software;

The software may use fast, read-only access to the BRAM, where 32-bit reads should have latency of 1 cycle;

The data stored in BRAM should be per-channel bitmaps, i.e., a 32\64-bit read by software should return 32\64 contiguous bits corresponding to 32\64 flows for a particular channel. This is 32\64 consecutive bits on a single row. This is achieved by the transposing taking place when enqueuing a flow, so that software can dequeue by doing reads quickly to check flow locations for a single channel;

The programmable logic may receive just two instructions from the software for modifying bitmaps, namely, (1) write 2×64-bit values at a given queue location and (2) left-shift all bitmaps by a given number of bits, filling right-most bits with zeros;

Queue of 256 16-bit flow indexes is managed by the software as a circular list and kept in sync with bitmaps;

Flow index list may use head and tail pointers;

Software may also track tail pointer for bitmaps.

Referring to FIG. 17, the same service queue as illustrated in FIG. 6 is illustrated, but with the list of service flows separated for increased clarity. The software may be used to manage (e.g., reads and/or writes) the list of service flows as well as the head and tail pointers for the list. The software may also manage the tail pointer for the bitmap array. The bitmap array may be made up of 256 queuing positions, with 128 bits at each position, corresponding to preferred and non-preferred channels for the service flow queued at that location. The bitmap array is read and written to by programmable logic based on instructions from the software. The software may also include read access to the bitmaps on a per-channel basis.

The following sections provides exemplary example of the enqueuing and dequeuing operations as illustrated in FIG. 6 through FIG. 15. Initially, service flows 7, 14, 341, 73, . . . , 869, 32 are queued to the service. The head of the queue is at position 0 in the bitmap array. In this example, the head of the service flow list is at index 4 and the tail is at index 1. In general, the head and tail of the service flow list may be anywhere in the range 0-255 as it is a circular list where the head moves as flows are dequeued. This is a modified bitmap array where the head end is relocatable. In this example, the service flow list indexes 4, 5, 6, . . . , 254, 255, 0, 1 correspond to indexes 0, 1, 2, . . . , 253 in the bitmap array. In both cases, 253 queueing positions are occupied.

Referring to FIG. 17, in the same enqueuing example as in FIG. 7, service flow 516 is added to the queue. A value of 516 is written by the software to the service flow list at the tail (1) and the tail is moved on to the next position (2) by the software. The preferred and non-preferred channel bitmaps are written to the bitmap array at the tail (253) by programming logic based on instructions from the software, and the tail is moved on to the next position (254) by the software. The bitmaps are written as shown in FIG. 8. Since the bitmaps are stored in BRAM as contiguous bits for a single channel (i.e., rows in FIG. 8), the transposing operation preferably happens at this stage, i.e., the 128 bits for flow 516 are written to bit position 253 of 128 individual bitmaps of 256 bits. In practice, only bits that are set in the preferred\non-preferred bitmaps are written. Either way, this is often a slow operation.

The software can find a service flow to dequeue for a particular channel by doing as many 32\64-bit reads as required to read all 256 bits for a single channel preferred\non-preferred, or up to the tail pointer of the bitmap array. For a 32-bit CPU, this is 8 reads maximum for the preferred bitmaps, 8 reads max for the non-preferred. Each read should take a single cycle, so this operation is often reasonably efficient.

Referring to FIG. 18, in the same example as in FIG. 9, the software may dequeue a flow for downstream channel 4 and finds that the preferred bitmap for service flow 14 is the first that has bit 4 set. To remove service flow 14 from the queue, the software stores the index of the bitmap array where service flow 14 was found, and instructs programming logic to write bitmaps of all zeros to bit position 2 (see FIG. 11). This tends to be a slow operation, as it involves setting a zero at bit position 2 in 128 individual bitmaps. To remove the flow from the flow list, the software writes −1 to the list at position (head+2) mod 256, which in this case is 6. Note that, in practice, it may be preferable to maintain a valid-bitmap of queue locations where flows are queued, i.e., a single 256-bit vector, where a 1 indicates that a flow is queued at that position. This means that the operation to zero all bits at a given position can be skipped. Instead, when reading channel bitmaps during dequeuing, the channel bitmap should be ANDed with the valid-bitmap before searching for a bit set.

Referring to FIG. 19, in the same example as in FIG. 12, the software may find a service flow for downstream channel 2 and sees that service flow 7, which is at the head of the queue, has bit 2 set in its preferred bitmap. The software looks at the service flow list and sees that once the service flow at the head (position 4) is cleared, the first 3 positions in the queue are now empty. Therefore, it moves the head pointer on by 3, i.e., head=(head+3) mod 256. It also sends an instruction to programming logic to left-shift the bitmap array by 3. This is often a slow operation as it involves modifying 128 individual bitmaps. In practice, it may be preferable to left-shift only when a minimum number of queue entries are free at the head. For example, if the shift operation is done only when there are 32 free entries, this means the shift is needed only 1 in 32 dequeues, at most. This is a trade-off against some wastage of queuing capacity. It may also be advantageous to use blocks of 32 bits, as on a 32-bit CPU the 256-bit vector can be shifted simply by copying 7×32-bit values to the next lowest memory address.

By way of example, in a field programmable gate array, the implementation may be split between the programmable logic and associated software.

For example, 128 vectors of 256 bits in BRAM managed by programmable logic on instruction from software:

The programming logic may, for example, manage the following for the data structures:

```
sgnprefchbitslo<1:0><63:0><255:0> //Lo-pri, npref, 16Kbits per SG;
sgprefchbitslo<1:0><63:0><255:0> //Lo-pri, pref, 16Kbits per SG;
sgnprefchbitshi<1:0><63:0><63:0> //Hi-pri, npref, 4Kbits per SG;
sgprefchbitshi<1:0><63:0><63:0> //Hi-pri, pref, 4Kbits per SG.
```

The software may, for example, manage the following for the data structures:

```
uint16_t flowListLo[2][256] //Lo-pri, 512 bytes per SG;
uint16_t flowListHi[2][64] //Hi-pri, 128 bytes per SG;
unsigned bitmapLoTail;
unsigned flowListLoHead, flowListLoTail;
unsigned bitmapHiTail;
unsigned flowListHiHead, flowListHiTail.
```

The size of bitmap arrays may be 40 Kbits=5 KB per service group. This is consistent with the transpose technique.

The programming logic may, for example, manage the following for the bitmap operations. The software will send instructions to programming logic to modify the bitmap arrays and programming logic will also need to provide a status bit to the software to indicate that an operation is in progress. The software may wait until this bit is clear before reading any bitmaps or sending any further instructions to programming logic. There are two instructions that may be supported by the programming logic.

First, write_transposed to write 128 bits for a single flow to 128 channel bitmaps that may include the following parameters:

```
sg // SG index, 0 or 1;
pri // Lo or hi priority, 0 or 1 (or use BRAM address instead of sg, pri);
pos // Bit position (0-255 for lo pri, 0-63 for hi pri);
nprefbits<63:0> // Non-preferred bitmap;
prefbits<63:0> //Preferred bitmap
```

Algorithm:

```
sgnprefchbits = pri ? sgnprefchbitshi : sgnprefchbitslo; // Non-pref channels for SG
sgprefchbits = pri ? sgprefchbitshi : sgprefchbitslo; // Pref channels for SG
for(i = 0; i < 64; ++i) {
    sgnprefchbits<i><pos> = nprefbits<i>; // Or: if(nprefbits<i>) sgnprefchbits<i><pos> = 1;
    sgprefchbits<i><pos> = prefbits<i>; // Or: if(prefbits<i>) sgprefchbits<i><pos> = 1;}
```

Second, lsh_bilmaps to left-shift entire array of 128 channel bitmaps by fixed amount, zero-filling from right, that may include the following parameters.

```
sg // SG index, 0 or 1;
pri // Lo or hi priority, 0 or 1 (or use BRAM address instead of sg, pri);
num // Number of bits to shift left (0-255 for lo pri, 0-63 for hi pri)
```

Algorithm:

```
sgnprefchbits = pri ? sgnprefchbitshi : sgnprefchbitslo; // Non-pref channels for SG
sgprefchbits = pri ? sgprefchbitshi : sgprefchbitslo; // Pref channels for SG
sgqueuedmax = pri ? 64 : 256;
for(i = 0; i < 64; ++i) {
    for(j = 0; j < sgqueuedmax - num; ++j) {
        sgnprefchbits<i><j> = sgnprefchbits<i><j + num>;
        sgprefchbits<i><j> = sgprefchbits<i><j + num>;}
    for( ; j < sgqueuedmax; ++j) {
        sgnprefchbits<i><j> = 0;
        sgprefchbits<i><j> =0;}}
```

The software may do a single write_transposed operation to enqueue a flow to the service group. To remove a service flow from the head of the queue, the software may do a single lsh_bitmaps operation, whereas to remove a service flow from within the queue a write_transposed may be done with zero bitmaps.

One case to consider is dequeuing for an OFDM channel, where the system may dequeue up to 5 flows at time for increased efficiency. This transpose lends itself to finding these flows, since the software can access the channel bitmaps directly, and readily find bits set using the clz instruction (i.e., count leading zeros). However, the system will then remove these 5 flows from bitmap array, which will involve up to 5 write_transposed or lsh_bitmaps operations. Preferably, the software can perform other processing without having to wait for these operations to complete. Therefore, a queue of up to 8 operations may be implemented in programming logic. This would also facilitate the software to enqueue multiple flows at ingress without blocking for each one to complete.

It is advantageous to use a layout for the bitmap arrays where the head position is maintained at bit position 0. There is a substantial of overhead involved for the software in searching for bits set between variable start and end positions. By maintaining the start bit fixed at the highest\lowest position makes things more computationally efficient, and reduces shifting and/or masking operations in the software. For example, using a circular bitmap array where the queue is nearly full, the tail bit may be in the same 32\64-bit word before the head bit. This means that the software search needs to take account of the fact that the search begins in (say) bit 20 of a particular word, continues through all the other words to the end of the array, wraps back to the start, and finishes in (say) bit 10 of the word containing the head.

The design permits the software to maintain control over the queuing, i.e., has visibility of channel bitmaps etc., and some the transposing operations are offloaded to programming logic. This enables simpler modifications to dequeuing if the criteria are modified.

All the software processes are preferably executed on a single processor, rather than two separate software applications. This way, there would be plenty of software work to do while transpose operations are in progress. However, the channel accounting and the service scheduling may result in bottlenecks. To reduce such bottlenecks a couple modifications may be implemented, as desired. First, instead of having separate software applications for channel accounting and service schedule, they are preferably combined for each service group. Second, rather than using 2×32-bit applications, preferably the software uses a single 64-bit application. A single 64-bit consumes fewer resources than 2×32-bit. A 64-bit software application provides a performance boost. Service scheduling involves bitmaps, which may be 64-bit, halving the processing in many cases. For example, when dequeuing for an SC-QAM channel, rather than possibly having to search through (8+2+8+2)=20×32-bit bitmaps to find that all (256+64=320) queued DOCSIS service flows and not using the SC-QAM, the number of bitmaps would halve to 10. Timer processing channel accounting also uses bitmaps, so would benefit from 64-bit operations as well.

While the aforementioned techniques provide an enhanced quality of service, depending on the particular configuration, they tend to use a substantial amount of computational resources. It is desirable to provide a similar enhanced quality of service while reducing the computational resources required.

Figure 20:
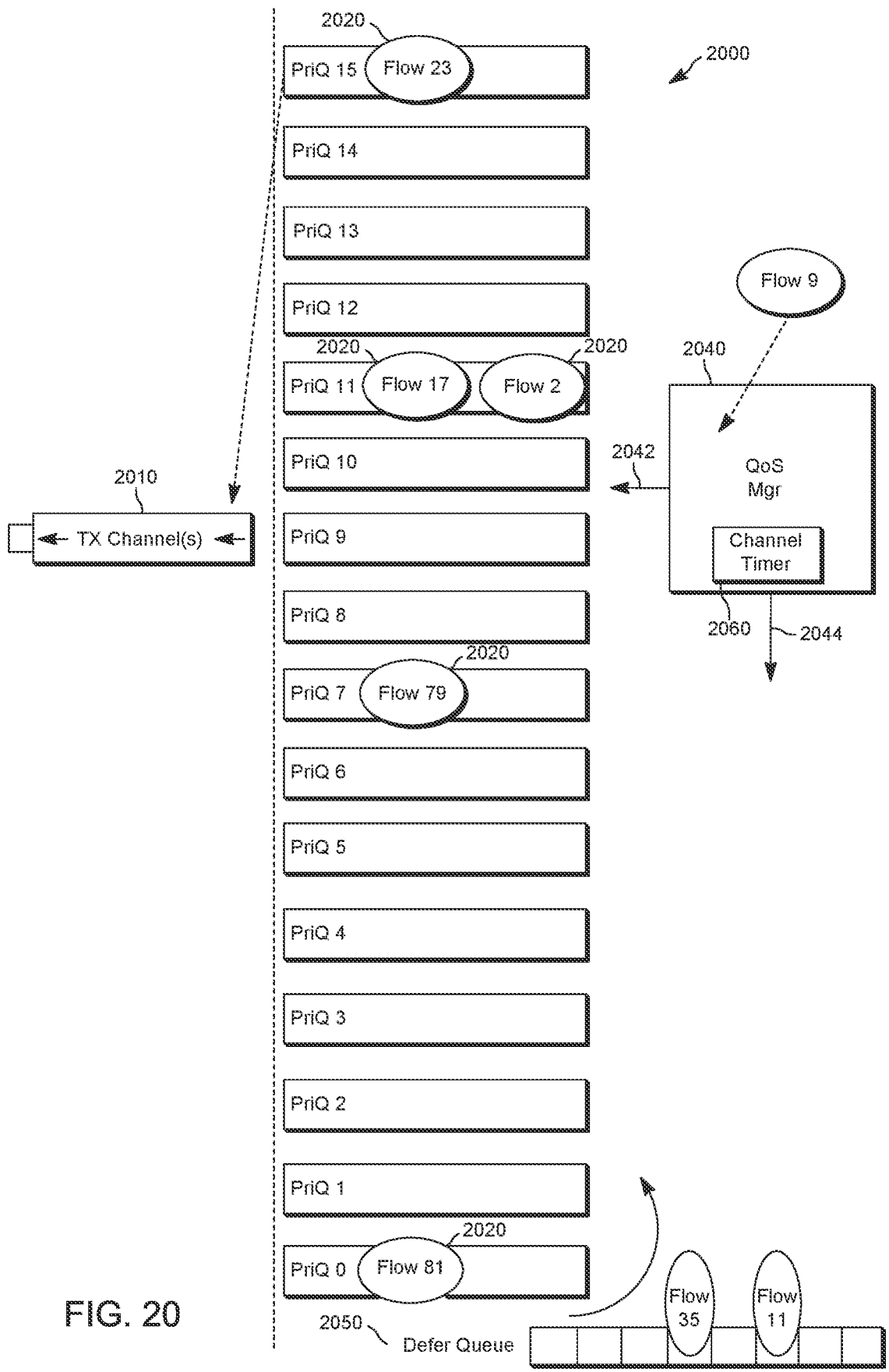
FIG. 20 illustrates a system with a priority queue.

Referring to FIG. 20, multiple priority queues 2000 may be included, from which, may be used for the transmission of service flows 2020 on one or more channels 2010, each of which are referenced by a number, 0, 1, . . . , N−1, with the higher the number the greater the priority. An exemplary set of 16 priority queues (e.g., N=16) is illustrated. The system may make requests to transmit data from the service flow(s) 2020 on one or more of the channels 2010, with each service flow 2020 being configured with a priority level in the range of 0, 1, . . . , N−1. The service flows 2020 preferably have the same range as the number of priority queues 2000, and are also configured with a maximum traffic rate entitlement. By way of example, in the DOCSIS standard, each flow may be configured with one of eight priority levels, 0-7. Each flow may also be configured with a max-bitrate (entitlement), and a min-bitrate (entitlement). By way of example, the system may be configured with 16 physical priority queues. Most of the time, only the lowest 8 are in use, each of these corresponding directly to a configured DOCSIS priority 0-7 for each flow. Preferably, the system monitors and checks the downstream QoS of flow bitrates to verify that each flow is at least achieving its min-bitrate. Any flow that isn't achieving its min-bitrate is increased up to the higher set of 8 priority queues. Therefore, for a flow of priority 6 that is not receiving its min-rate is queued to priority queue 14 (of 0-15). This is one manner of implementing min-bitrates, i.e., using a higher set of priorities.

A quality of service (QoS) manager 2040, which may be implemented in software and/or hardware, determines whether to queue the service flow to one of the priority queues 2042 based upon the service flow's priority, or to defer the service flow 2044 in a defer queue 2050 for a variable period of time as the service flow is getting more than its configured entitlement. The QoS manager 2040 may include a channel timer 2060 that dequeues the service flows using a strict priority, i.e., always takes a service flow from the highest available priority queue. With such a dequeuing technique, if a channel is oversubscribed, there naturally exists a threshold priority level P. Service flows with higher priorities than the threshold priority level P will achieve full service, by virtue of the strict priority queuing. Service flows with lower priorities than the threshold priority level P will get zero service. Flow with priority equal to P will get some service, averaging in the range of 0% to 100% of their full service.

The QoS manager 2040 may include an additional requirement that service flows with priority level P (or greater) should receive roughly equal percentages of their maximum allowed service, i.e., service flows at the threshold priority receive a level of service that is scaled proportionally to their maximum. The QoS manager 2040 may achieve this using any suitable technique, such as for example, deferring service flows for a suitable time period if their service level is sufficiently above average, or sending service flows immediately to the priority queues if its service flow is below average.

The QoS manager 2040 may define an "operating point" for the channels as a pair of numbers (P, m), where P is the threshold priority, and m is the percentage of service that flows of priority P are achieving. In general, the operating point looks at the service flows for the priority queue that's on the boundary (holding cell) and determines a likelihood of the service flows getting through under the current bandwidth conditions. This pair numbers may be maintained by the QoS manager 2040. If a channel is not congested, all flows using that channel preferably receive their full service.

The operating point is then referenced as, (N−1, 100), i.e. all priorities are receiving full service, where N refers to the number of priority queues the system is attempting to emulate. Using such a technique, the operating point of each channel is a weighted average of the service level being achieved by the flows on the channel. The operating point may then be used to reduce the variance of the service level across flows, i.e., to modify the flow's service level closer to this average. Unfortunately, this tends to result in undesirable effect of the operating point drifting. To accommodate the operating point drifting, the QoS manager 2040 may periodically bias the operating point upwards (i.e., increase m, and if necessary, P). While this provides for some accommodation, it tends to sacrifice fairness across the service flows in favour of ensuring channels are more fully utilized. In this manner, the system 'bumps' the likelihood up a little when determining which service flows the to move from the defer queue 2050 to the output queues. In this manner, the defer queue 2050 doesn't slow down the system by retaining to many service flows when the bandwidth is actually available for the service flows to be transmitted.

Figure 21:
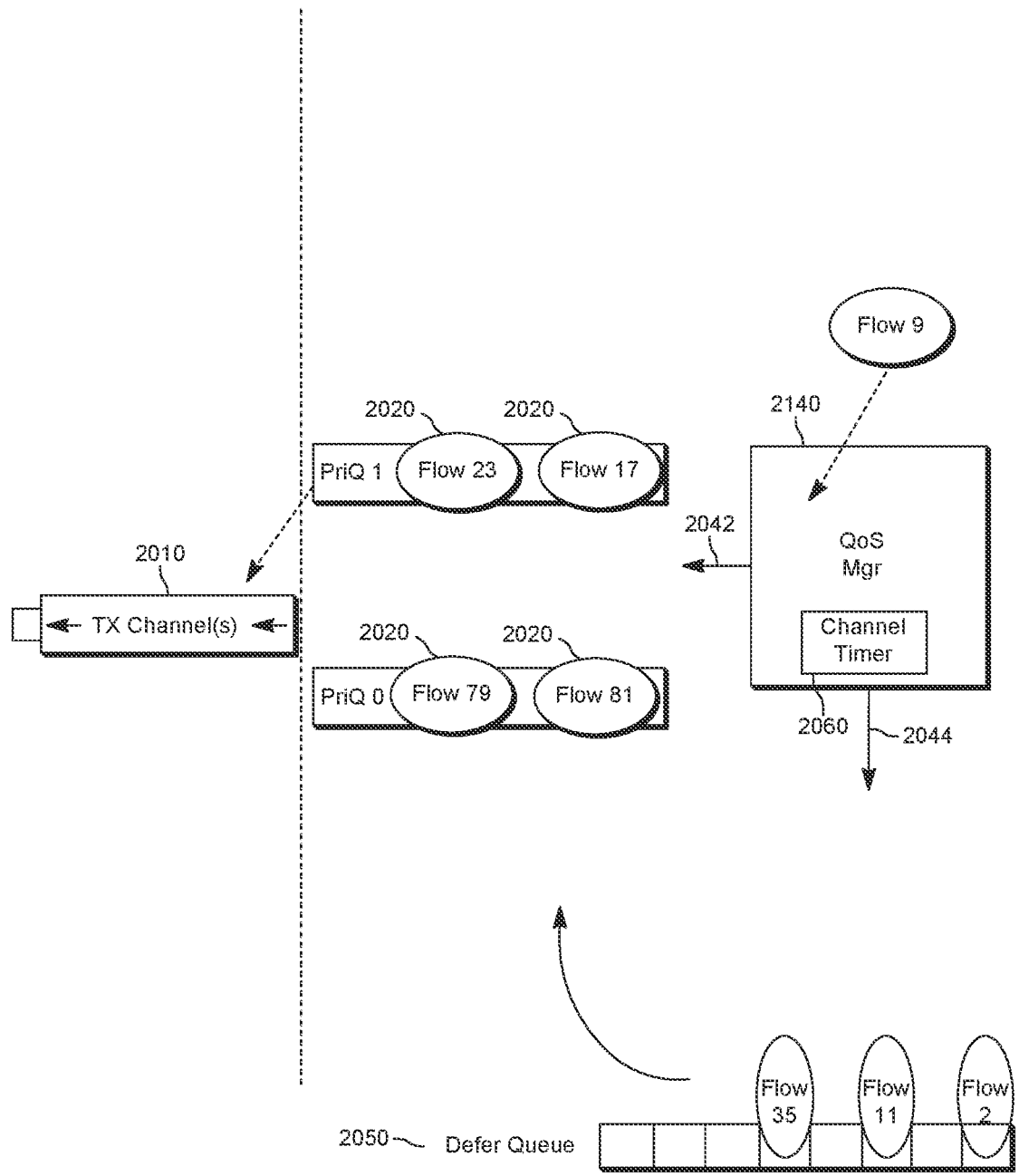
FIG. 21 illustrates another system with a priority queue.

Referring to FIG. 21, to decrease the computational complexity of the system, it is desirable to generally emulate the characteristics of FIG. 20, with only a limited number of queues, such as two queues. In a manner similar to that of FIG. 20, a quality of service (QoS) manager 2140 may determine and maintain the same operating point (P, m) for the channels, where m is the average service level achieved by the service flows of priority P, which may be periodically biased upwards. The QoS manager 2140 may send service flows that have priority level lower than P to the defer queue 2050 for up to the longest time period supported by the defer queue 2050. The defer queue 2050 tends to generally emulate the behaviour of FIG. 20, where the service flows are provided zero service.

The QoS manager 2100 may send service flows that have priority level greater than P to the high priority queue 2000 so that they will receive timely service. The QoS manager 2140 may send service flows that have priority level equal to P to either the defer queue 2050 or the low-priority queue depending on whether their current service levels are above or below the average (m) (or other metric) for that priority on the channels.

A secondary operating point, M, is maintained for the channels which is the average service level achieved on the channels by service flows with priority higher than P. Typically, this is close to 100%. The QoS manager 2140 monitor the channels at some suitable interval. If the channels are found to be uncongested, the operating point values (P, m, M) may be set to (N−1, 100, 100). Otherwise, if M is found to be less than 100%, or substantially less than 100% (e.g., more than 5%), then it implies that the channels are congested, and service flows with priority greater than P are not achieving full service. In such a case, if there have been more than two priorities (or other value) higher than P in use over the monitoring interval, P is increased to the lowest of these values (Pnew) and the operating point parameters are changed to: (Pnew, 100, 100).

In another embodiment, any number of priority queues may be used that are less than the number of service levels (e.g., 2, 4, 6, 8, etc.).

As a general matter, each flow may a priority selected from among the different priority levels. While the priority for a flow may be static, it may also be dynamic in nature. For example, the priority for a flow may be a static initial value that is then dynamically adjusted based on the bitrate being achieved by a flow at any point in time, or any other suitable criteria.

Moreover, each functional block or various features in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A system for queuing service flows for a cable system comprising:
   (a) a head end connected to a plurality of customer devices through a transmission network that includes a remote fiber node that converts received data to analog data suitable to be provided on a coaxial cable for said plurality of customer devices, where said head end includes at least one processor;
   (b) said head end queuing a plurality of service flows to a plurality of channels in a priority queue, in a manner independent of either of byte length and maximum byte size;
   (c) said head end dequeuing said service flows queued to said plurality of channels from said priority queue;
   (e) providing said dequeued service flows to at least one of said plurality of customer devices;
   (f) wherein said queuing each of said plurality of service flows is based upon a priority level;
   (f) enqueuing said service flows queued to said priority queue based upon an operating point that is based upon three parameters, a first one of said three parameter comprising a threshold priority, a second one of said three parameter comprising a weighted average percentage of maximum bitrate entitlement being achieved service flows of said threshold priority, and a third one of said three parameter comprising a weighted average percentage of maximum bitrate entitlement being achieved service flows above said threshold priority.

2. The system of claim 1 wherein a number of available priority levels is the same as a number of available queues for said plurality of channels.

3. The system of claim 1 wherein each of said service flows has a maximum traffic rate entitlement.

4. The system of claim 1 further comprising a quality of service manager that selectively determines whether to queue one of said service flows to one of said channels.

5. The system of claim 4 further comprising said quality of service manager that selectively determines to queue one of said service flows to one of said channels in a non-priority queue.

6. The system of claim 4 further comprising said quality of service manager that selectively determines to queue one of said service flows to one of said channels in a defer queue.

7. The system of claim 1 further comprising a channel timer that said dequeues said service flows queued to said plurality of channels from a highest available priority queue.

8. The system of claim 1 further comprising enqueuing said service flows queued to said priority queue based upon an operating point.

9. The system of claim 1 wherein each of the service flows is configured to have a priority level in the range of 0 to N.

* * * * *